May 31, 1938.  G. CHARLTON  2,119,042
VALVE
Filed Dec. 20, 1937  2 Sheets-Sheet 1
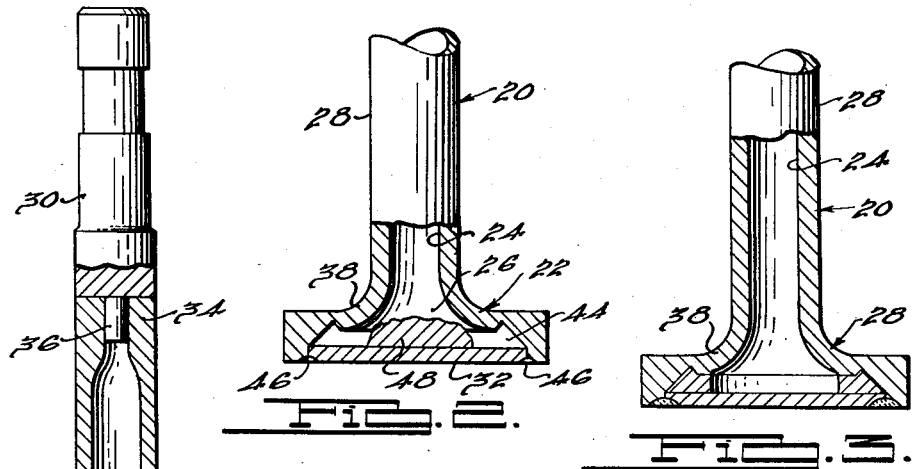
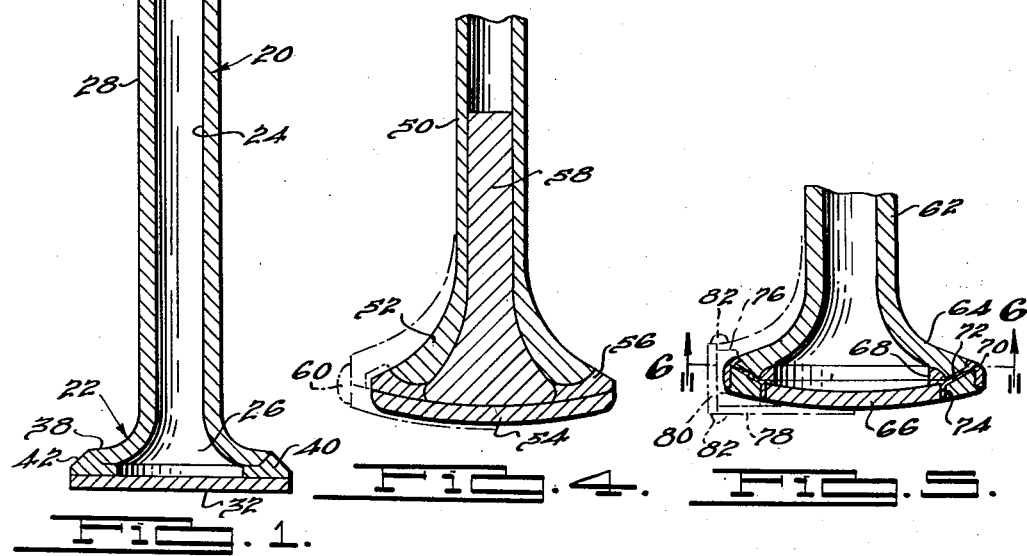
INVENTOR
George Charlton.
BY Harness, Dickey & Pierce.
ATTORNEYS.

May 31, 1938.    G. CHARLTON    2,119,042
VALVE
Filed Dec. 20, 1937    2 Sheets-Sheet 2
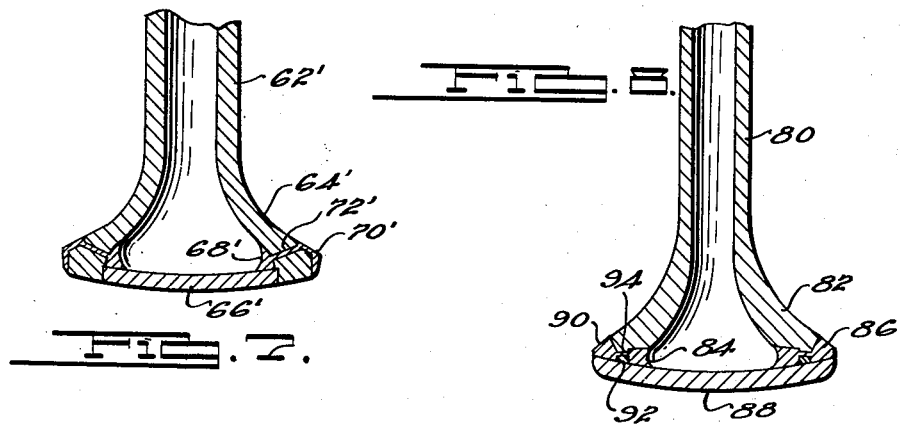
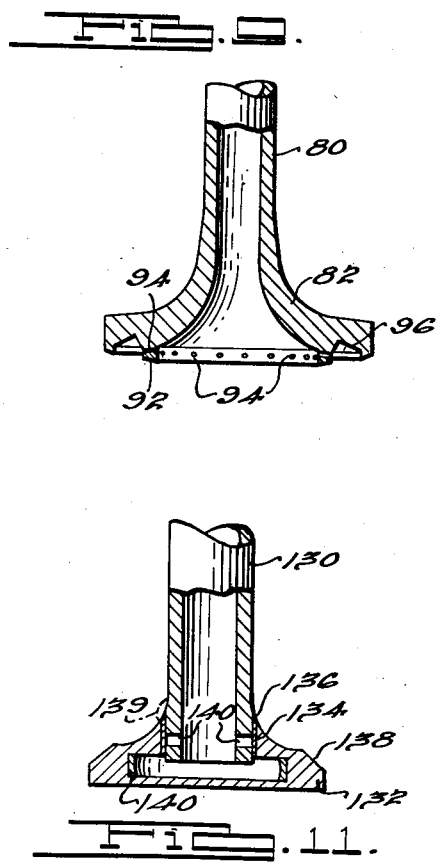
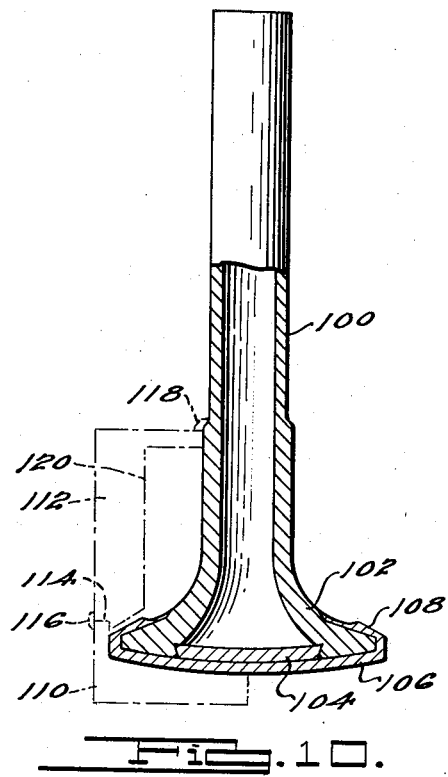
INVENTOR
George Charlton.
BY
Harness, Dickey & Pierce.
ATTORNEYS.

Patented May 31, 1938

2,119,042

UNITED STATES PATENT OFFICE 2,119,042

VALVE

George Charlton, Battle Creek, Mich., assignor to Eaton Manufacturing Company, Cleveland, Ohio, a corporation of Ohio Application December 20, 1937, Serial No. 180,761

12 Claims. (Cl. 123—188)

This invention relates broadly to hollow bodies, and is particularly applicable to valves of the poppet type and while in the broader sense it may be applicable to any type of poppet valve it is particularly applicable to poppet valves for use in connection with internal combustion engines. The present invention constitutes a division of my application for Letters Patent of the United States for improvements in Valve structure and method of forming, filed June 28, 1937, Serial No. 150,771.

Objects of the invention include the provision of a new and novel hollow body structure; the provision of a closed hollow body formed from a plurality of separately formed parts integrally united by a centrifugally distributed mass bonded to said parts; the provision of a new and novel poppet valve structure; the provision of a poppet valve having a new and novel seating face structure; the provision of a poppet valve made up of a plurality of separately formed parts in which the various parts are integrally joined to one another by a bonding agent forming a seating face therefor; the provision of a hollow valve of a new and novel construction; the provision of a hollow poppet valve having a separately formed head and end wall portion integrally joined thereto by a welding operation; the provision of a hollow valve structure having a centrifugally distributed alloy seating surface also forming a bond between separately formed parts of the valve; the provision of a novel type of self-container, self-cooling type of poppet valve; the provision of a poppet valve in which the head portion thereof is provided with an enclosing covering of special alloy; and the provision of a poppet valve having a special alloy seating surface intimately bonded thereto.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Figure 1 is a side elevational view of a poppet valve the lower portion of which is shown in central section;

Fig. 2 is a fragmentary partially sectioned side elevational view of the blank from which the valve shown in Fig. 1 is produced, in one of the early stages of its manufacture.

Fig. 3 is a view similar to Fig. 2 but showing the blank in a later stage of manufacture and in condition to be machined to form the valve indicated in Fig. 1;

Fig. 4 is a fragmentary sectional view taken centrally through a poppet valve of a slightly modified form of construction and indicating an internal coolant positioned therein;

Fig. 5 is a view similar to Fig. 4 of another modified form of construction;

Fig. 6 is a transverse sectional view taken on the line 6—6 of Fig. 5;

Figs. 7 and 8 are views similar to Fig. 4 illustrating other modified forms of construction;

Fig. 9 is a fragmentary, partially sectioned view of the main body portion of the valve shown in Fig. 8 prior to the application of the cover to the open end thereof, to better illustrate the construction;

Figs. 10 and 11 are views similar to Fig. 4 illustrating further modified forms of construction.

Prior to the practice of the present invention the only commercially satisfactory hollow poppet valves, and particularly those of the type having a self-contained mass of internal coolant material, have been formed from a single piece of metal, usually by first forming a cup-shaped blank of a diameter slightly greater than that desired in the finished valve head and then reducing all of the blank except that portion which is to form the head to a diameter such as to enable a stem of the desired diameter to be machined from it. It will be appreciated that such methods of production necessitate a great amount of work, a large amount of skill and involve relatively expensive forming operations, resulting in a valve of relatively high cost. At the same time a valve is produced in which the wall thicknesses are impossible of accurate control and a certain percentage which are, therefor, liable to destruction in operation due to thin wall areas rupturing under the internal pressures developed.

It has heretofore been suggested that hollow valves intended to contain sodium or other cooling agent be formed by constructing the valve in two or more pieces each of which may readily, easily be machined and thereafter welding them together by known methods, as for instance electric or gas welding, but this practice has never become commercially practicable for the reason that it is commercially impracticable in production to produce this type of valve in this manner without an unduly large percentage of scrap, and the final product, even where the weld appears perfect, too frequently develops cracks in the welded zones which permit escape of the cooling medium. Because of these reasons, such types of valves as have heretofore been successfully used commercially and produced in commercial quantities have been produced from a single piece of metal as first described in spite of the greatly increased cost of the same.

In accordance with the present invention a hollow type of poppet valve adapted to contain a self-contained internal coolant is produced by independently forming a plurality of parts thereafter securing such parts together. The securement of these parts together to form a connection between them which will enjoy freedom from cracks, leaks and the like as in the prior suggested welded constructions is accomplished by assembling the independently formed parts together and thereafter welding and/or bonding the parts together by centrifugally distributing a molten mass of metal to the joints between the independently formed parts. As disclosed in the parent case above identified of which the present application is a division, this welding or bonding step is preferably accomplished by inserting the welding or bonding material in solid form within the hollow head of the parts going to make up the assembled valve, or in suitable relation with respect to the joint between the assembled parts, then subjecting the assembly to sufficient heat to melt the welding or bonding material and then subjecting the assembly to the effects of a spinning operation whereby to centrifugally distribute the molten welding or bonding material to the joints between the independently formed parts and continuing the spinning operation until the molten metal has cooled and solidified. Where proper metals or alloys are employed for the independently formed parts of the valve and for the welding and/or bonding material and the process is carried out with reasonable care, a perfectly formed valve results, the joints being free of cracks or other infirmities and remain fluid tight for periods of operation commensurate with and usually exceeding those obtainable with similar types of valves formed from a single piece of metal.

One of the principal advantages of producing a valve in accordance with the present invention is that the valve in being made from a plurality of independently formed parts permits the interior of those parts which cooperate to form the hollow interior of the valve to be easily and accurately internally machined before assembly and, therefore, permits accurate control of the wall thicknesses of the finished product to an extent impossible of attainment in valves formed from a single piece of metal in accordance with conventional practice.

In accordance with a further phase of the present invention the welding and/or bonding material which is employed to secure and seal the various independently formed parts of the valve together, where formed from material having suitable characteristics, may be employed to also form the valve seating surface of the valve. In other words this welding and/or bonding material may have certain characteristics which render it unusually resistant to the corrosive and/or erroxive effects of the fluid to be controlled by it and particularly exhaust gases of internal combustion engines, and in such case if it is so arranged in the final product as to form the valve seating surface it will result in a superior final product because of these characteristics.

As explained in the parent application of which the present application is a division, where the welding and/or bonding material is of a character suitable or desirable for the formation of valve seating surfaces, the independently formed parts may be so constructed and arranged as to form an annular channel including that portion of the finished product which is to form the valve seating surface, and means may be provided whereby the molten welding and/or bonding material may be projected into such annular space under the influence of the centrifugal action set up during the spinning operation. Not only is the final product resulting from the above described process superior to the best valves of this type now obtainable on the market, but additionally they may be constructed at a materially smaller cost and are thus made available to a much larger field of use.

Referring now to the accompanying drawings and particularly to Figs. 1, 2 and 3, in Fig. 1 a valve is shown comprising a stem portion indicated generally at 20 and a head portion indicated generally at 22. The stem 20 is hollow and, therefore, provided with a bore 24 which is in open communication with the hollow space 26 within the head 22. The valve is formed of three major independently formed parts, namely a main body portion 28 comprising the hollow portion of the stem 20, a solid stem extension 30 and a head cap or cover portion 32. The main body portion 28 at its small end has its wall thickness increased as at 34 so that the bore 24 is reduced in diameter at this point, this reduced portion of the bore is reamed out to receive a taper pin 36 which is firmly driven into place and finished off flush with the end of the main body portion 28 after which the stem extension 30 is welded in place on the end of the main body portion 28. This construction is followed where the hollow interior of the valve is provided with a suitable mass of sodium or other internal coolant so as to prevent possible escape of such internal coolant from this end of the valve during service. This last described part of the construction is no part of the present invention and is described simply as illustrative of a suitable manner of closing the small end of the main body portion 28.

The main body portion 28 as initially and independently formed includes an outwardly flared portion 38 forming a portion of the valve head 22. In fact it is the space within the flared-out portion 38 that constitutes the main volume in the space 26 of the hollow head 22 in the finished valve, and it will be appreciated that by forming the portion 38 with the portion 28 it is possible to accurately machine the interior surfaces of both portions 28 and 38 to bring them into conformance with a predetermined size, shape and contour.

In the construction shown in Fig. 1 the portions 32 and 38 are separated from one another by a ring 40 of material which is bonded to both portions and which is so located as to form the valve seating surface 42 of the valve.

The main body portion 28 and cap or cover 32 may be made from any suitable steel or steel alloy such as is commonly used for the valves of internal combustion engines. Where the valve is to be used as an exhaust valve this portion of the valve is preferably of a type of steel that will stand the high temperatures and corrosive action of exhaust gases and in such case it may be desirable to employ an alloy generally known to the trade as silicrome X-142 having the following analysis:

|  | Per cent |
|---|---|
| Carbon | .40 to .50 |
| Manganese | .70 maximum |
| Chromium | 13.00 to 15.00 |
| Nickel | 13.00 to 15.00 |
| Silicon | .30 to .80 |
| Tungsten | 1.75 to 3.00 |
| Phosphorus | .03 maximum |
| Sulphur | .03 |
| Iron | Remainder |

The main body portion 28 may be made from bar stock and suitably machined to shape as shown, it may be made from bar stock substantially the diameter of the stem 40 and the enlarged end thereof provided by upsetting or the like, or it may be made from tubular stock and one end of the valve stem upset or otherwise acted upon to provide the substantially closed end portion and the opposite end swaged, pressed or otherwise suitably acted upon to expand it to the desired diameter for the head portion 38. In any event the hollow interior of this part of the valve will be open to ready machining over its entire interior surfaces thereby permitting the wall thickness of the finished valve to be definitely determined with the desired degree of accuracy.

The material from which the ring 40 is formed will usually be of a composition which will be determined to a great extent by the use to which the valve is to be put, but in all cases will be of a lower melting point than the metal of the main body portion where the method disclosed in the parent application above referred to is employed in the manufacture of the valve. Where the valve is not required to withstand anything above normal temperatures, or relatively low temperatures, where the range of temperature variation to which it will be subjected is relatively small, and where the valve will not be subjected to severe working conditions that might cause it to hammer on its seat, it may be made of hard solder, spelter, aluminum bronze, or the like. Where higher temperatures are to be encountered by the valve any suitable metal or alloy capable of being bonded to the head 38 and cover 32 in molten condition and of a character to withstand the temperature to be encountered without melting or materially weakening its structure, and which preferably has a coefficient of thermal expansion similar to the remaining material in the valve may be employed. Where the valve is for an internal combustion engine and particularly where it is of the internally cooled type embodying a self-contained mass of sodium or other suitable material such as that indicated, requiring it to withstand relatively high temperatures as well as to withstand the pounding to which such valves are subject, and the body of the valve and the closure 32 are formed from suitable steels, a suitable steel alloy having a melting point lower than that of the main body portion 28 of the valve and the cover 32, and having a coefficient of expansion similar to that of the material forming the main body portion 28 and cover 32, will usually be found preferable. Where as in the case illustrated in Fig. 1, the material 40 in its final form is also to serve the purpose as the seating surface of the valve and for that reason is desired to be of a type of material that is relatively hard and resistant to wear as well as resistant to the corrosive and/or errosive effects of the high temperature exhaust gases, an alloy of approximately the following composition has been found suitable.

|  | Per cent |
|---|---|
| Carbon | 0.76 |
| Manganese | 0.14 |
| Chromium | 9.04 |
| Silicon | 0.63 |
| Nickel | 33.17 |
| Boron | 1.87 |
| Balance | Principally iron |

The melting point of this alloy is approximately 2075° F. With this alloy spinning can readily be done between 2150° and 2200° F. and it may be employed where the main body portion of the valve and the cover 32 are made of steels having ordinary melting points. Where employed in such a way as to form the valve seating surface it provides such surface having a hardness of approximately 35 Rockwell, C. scale.

Another alloy suitable for use as the material 40 where the main body portion 28 and cover 32 of the valve are formed from ordinary steel and where the valve seating surface is desired to be of extreme hardness as well as resistant to the corrosive and errosive effects of exhaust gases is as follows, the percentages given being more or less approximate.

|  | Per cent |
|---|---|
| Carbon | 0.38 |
| Silicon | 0.23 |
| Chromium | 14.53 |
| Tungsten | 18.08 |
| Boron | 3.5 |
| Balance | Principally iron |

The melting point of this alloy is approximately 2130° F. and successful spinning has been done with it at 2250° F. This alloy when used for the seat of the valve provides a hardness of 63 Rockwell, C. scale.

In order to form the valve shown in Fig. 1 the main body portion 28 and particularly the flared end portion 38 thereof is preferably formed in the manner indicated in Fig. 2. In other words the flared end portion 38 is initially constructed of increased diameter and is internally machined or otherwise acted upon not only to provide the space 26 occurring in the finished valve but also to provide a space of a similar shape to the ring 40, as indicated at 44 in Fig. 2 but of slightly larger dimensions and in open communication with the hollow interior of the flared interior of the flared end portion 38. The space 44 is provided with a cylindrical axial extension in which the cover or cap 32 is received with its surface preferably in substantially flush relationship with the corresponding end face of the head portion and it is welded thereto as at 46 so as to provide a temporary fluid tight joint between these parts. After this has been done a suitable mass 48 of the material from which it is desired to form the ring 40, preferably in granular form, is introduced into the hollow head portion of the assembly through the opposite end of the stem, this end not having its bore reduced at this time to receive the pin 36, and this assembly is then placed head down in a furnace of suitable type and heated until the mass 48 has melted and preferably to a temperature in the neighborhood of 100° F. above the melting point of the material from which the mass 48 is formed. The assembly is then preferably tipped so as to bring the axis of the stem 28 out of true vertical position and the assembly rotated slowly so as to cause the molten mass of material 48 to bathe the outer walls of the space 44 so as to wash any impurities that may be in contact with the wall away from the surface thereof and to cause such walls to be coated with the molten material. It will be noted that this action will bond the material to both those walls of the space 44 located within the head portion 38 and cap 32. After sufficient time has elapsed to permit this operation to be completed, the valve is then preferably removed from the furnace and subjected to a spinning operation, preferably under relatively high rotational speeds, which causes the molten mass of material to be thrown radially outwardly to the radially outer walls of the space 44 in a smooth and evenly distributed manner and the spinning is maintained until this mass of metal has solidified into the ring 40 which is intimately bonded to the contacting parts. Because of the manner of manufacture the molten metal which goes to make up the ring 40 is pressed against the surfaces to which it becomes bonded by a relatively high pressure, which compacts such metal and drives out all air, gas and particles of solid impurities from it, resulting in a ring 40 of compacted solid metal free from cracks, blow holes and impurities the presence of any of which might weaken the final product. The condition of the assembly shown in Fig. 2 after such an operation is illustrated in Fig. 3, after which it will be apparent that the only operation necessary to bring this end of the valve to completed condition is to reduce that end of the stem which is to receive the pin 36 and then subject the entire assembly to a suitable machining operation to bring it to the form indicated in Fig. 1.

The amount of material 48 which is placed in each valve as illustrated in Fig. 2 may be calculated but will ordinarily be determined by experimentation for each size and type of valve in which it is used.

After the head portion of the valve has been formed by machining the assembly illustrated in Fig. 3 to bring it to the condition shown in Fig. 1, if the valve is to be of the self-contained internal coolant type filled with metallic sodium or with other suitable material such, for instance, as disclosed in U. S. Letters Patent No. 1,670,965, to enhance the cooling properties of the valve, such material may then be introduced into the interior of the valve through the opening for the pin 36 and then such opening may be closed by the pin 36 and the end 30 applied as previously described upon which final machining of the valve may take place.

It will be understood that a valve manufactured in accordance with the above disclosure is relatively economical to produce in comparison to previous practices employed in connection with the production of an equivalent valve of equivalent desirable characteristics, that a valve formed in accordance with the present invention provides the additional advantage of enabling a valve seating surface of special alloy to be simultaneously produced, and that the final product when of the internally cooled type is equally efficient to all intents and purposes as similar types of valves produced from the single piece of material in accordance with previous practices.

In Fig. 4 a form of construction is shown which is modified from that indicated in Fig. 1 not so much in final result as in the formation of the pieces as originally and independently produced. In other words the main body portion 50 corresponds with the portion 28 previously described and the flared portion 52 corresponds with the flared end portion 38 of the main body portion 28 but in this case the wall thickness of the portion 52 is increased to a greater extent towards the head end of the valve. The cap 54 corresponds to the cap 32 previously described and the ring 56 corresponds to the ring 40 previously described. In this particular case the interior of the valve is shown as containing a mass 58 of sodium or other suitable material of the character previously indicated and such as it has been assumed that the valve shown in Fig. 1 will also preferably contain. The dotted lines in Fig. 4 indicate the initial shape of the head end portion of the main body portion 50 and of the cap 54. From the dotted lines it will be apparent that the cap 54, instead of being inset into the flared end portion 52, is simply abutted against it axially and welded thereto as at 60, the rest of the construction and the method followed out in producing the valve being substantially identical to that described in connection with the valve shown in Fig. 1.

In Figs. 5 and 6 a construction is shown including a main body portion 62 having a flared end portion 64 and a cap or cover 66. In this particular construction the cover 66 is set into the end of the flared end portion 64. Instead of having one solid ring of material such as the rings 40 and 56 previously described for bonding the main body and cap portions together and providing a valve seating surface for the valve, in the present case this material takes the form of a ring 68 on the hollow interior of the valve bonding the cover 66 to the main portion 62 and a second ring 70 on the outer surface of the valve providing a valve seating surface, the two rings 68 and 70 being interconnected by a plurality of equally angularly spaced spokes 72 of the same material, and the peripheral edge of the cap 66 being spaced from and bonded to the opposed surface of the flared end portion 64 by means of an additional ring 74 of the same material which also serves to additionally bond the cap or cover 66 to flared end 64. The construction shown in Figs. 5 and 6 is desirable in that that portion of the bonding material which serves to bond and seal the two parts together is relieved from the stresses and impacts applied directly to the valve seating surface during operation of the valve.

The spokes 72 occur as a result of the manner in which the valve blank is initially formed to provide the inner and outer rings 68 and 70 of a special alloy or other material, in order to convey this material in molten form from the hollow central portion of the head to that space in the blank from which the outer ring 70 is formed in the finished valve. The original form of the blank is indicated in dotted lines in Fig. 5 in which it will be noted that the outer peripheral face of the flared end portion 64 in blank form is provided with a groove 76, the cap 66 originally forms an axial projection on the cap blank 78 which extends radially outwardly into flush relationship with respect to the peripheral surface of the enlarged end portion 64, and a cylindrical ring 80 overlies the peripheral surfaces of these parts and is welded thereto as at 82. The spokes 72 are formed by means of holes which are drilled through the flared end portion 64 to connect the annular chamber formed between the grooves 76 and ring 80, and the interior of the valve head. In constructing the valve shown in Figs. 5 and 6 with this blank construction the alloying material is introduced into the hollow head of the valve in the same general manner as illustrated in Fig. 2, the assembly is heated until the alloy is in molten condition and is thereupon spun, causing sufficient of the molten alloy to flow through the openings forming the spokes 72 so as to fill the annular chamber formed by the groove 76 and ring 80, as well as to provide an excess within the hollow head to form the ring 68, and to flow into the space between the radial outer edges of the cap 66 and the opposed edges of the main body portion of the valve.

In the valve shown in Fig. 7 the construction is substantially the same as that illustrated in Fig. 5 except that the ring 74 is eliminated and the cap 66', corresponding to the cap 66 in Fig. 5, extends into direct metallic contact with the opposed face of the enlarged head portion 64' of the main body portion 62'. Otherwise the construction is identical and similar parts are indicated by the same numerals except that such numerals bear a prime mark, the construction being thus made obvious by a comparison to the description of the valve shown in Fig. 5.

In Fig. 8 a construction is shown including a main body portion 80, corresponding to the main body portion 28 in Fig. 1, and having a flared end portion 82 corresponding with the flared end portion 38 in Fig. 1. In this case two separate rings 84 and 86 respectively serve to bond the main body portion 80 to the cap 88 as well as to form the valve seating surface 90 in a manner similar to that in the valve illustrated in Figs. 5 and 6. In this case, however, the cap 88 is of the full diameter of the head of the valve and the two rings 84 and 86 are separated by a concentric axially projecting ring 92 formed integrally on the flared end 82 of the main body portion 80. The ring 92 is provided with radially directed openings 94 therethrough for the flow of molten alloy or other material from which the rings 84 and 86 are formed, when the alloy is in molten condition and the blank assembly is subjected to a spinning operation in the general manner described in connection with the previously described valve shown in Fig. 5. The main body portion 80 as initially and independently formed and prior to the application of the cap 88 thereto is illustrated in Fig. 9 from which it will be noted that the flared end portion 82 is originally constructed of a greater diameter and is provided with an annular groove 96 in its axially outer face of a shape similar to that desired in the finished ring 90. As will be apparent from an inspection of Fig. 9 the cap 88 is originally made of the same diameter as the flared end portion 82 in the original blank for the main body portion 80 and is applied thereto in the same manner as the cap 54 is applied to the main body portion 50 in the construction shown in Fig. 4 and is welded thereto in a similar manner. After this last operation the metal which is to form the rings 84 and 86 is then introduced into the hollow interior of the head of the valve and the valve is then heated, spun and machined in the same general manner as described in connection with the construction shown in Figs. 5 and 6 to bring the valve to the completed condition illustrated in Fig. 8.

In Fig. 10 a construction is shown including a main body portion 100 having a flared end portion 102 the open end of which is closed by a cap member 104 inset into it. Preferably, as indicated, the periphery of the cap 104 is of frusto-conical shape with the large end placed inwardly so as to provide a dovetailed effect as indicated. In this case no material equivalent to the special alloy or other material from which the ring 40 in Fig. 1, 56 in Fig. 4, and equivalent rings in the other modifications shown, is provided interiorly of the head of the valve. Instead the cover 104 is sealed to the main body portion of the valve by an exterior covering 106 of such material, this material extending completely over the head end of the valve and around that portion of the valve including the usual seat where it is formed to provide such usual seat 108. The material 106 in this case thus has the same ultimate effect as in the previously described constructions in that it serves to secure and seal the main body portion of the valve to the cover portion, as well as to provide a valve seat, but in this case the material also provides a complete enveloping protective covering for substantially the entire head of the valve.

As more fully explained in the parent application of which the present application forms a division, the coating 106 is applied in this case by means of an enveloping casing half of which is indicated in dotted lines in Fig. 10. This casing is made of two cylindrically shaped parts namely 110 and 112 which abut as at 114 and are welded together at this point as at 116 to form a temporary fluid tight joint. One axial face of the part 110 is internally shaped to conform to the shape of the desired peripheral and axially outer head portion of the desired finished product, provisions being made for machining stock. The portion 112 which fits over the stem portion of the valve and is welded thereto as at 118 to form a fluid tight joint, is hollowed out to form a chamber 120 in which the solid material which is eventually to form the coating 106 is initially placed. As in the previous cases this assembly, with the solid material which is to form the coating 106 placed within the chamber 120, is placed in a furnace and brought up to such temperature as to insure melting of this material and then the valve is subjected to a spinning operation to effect the distribution of the material as shown in the coating 106. As will be apparent this spinning operation will differ from the spinning operations employed in the valves previously described in that in this case, instead of spinning the valve around its axis, it is spun around a line perpendicular to the axis and spaced from the head portion of the valve, this throwing the molten material out towards the head end of the valve and causing it to assume the shape indicated in Fig. 10 in which shape it is allowed to solidify by cooling. After the material has solidified the casing members 110 and 112 are then machined away and the valve is brought to its final condition shown.

In Fig. 11 a construction is shown which is substantially the reverse from that shown in Fig. 10 in that in this case the special alloy or other material employed as a sealing and bonding agent is wholly positioned internally of the valve instead of externally as in the construction shown in Fig. 10. In Fig. 11 the valve consists of a hollow independently formed stem portion 130 and a hollow independently formed head portion 132 having a bore 134 into which the corresponding end of the stem portion 130 is projected and where it is bonded and sealed to the head portion 132 by means of a ring of material 136 disposed therebetween. The valve seating surface 138 is formed directly out of the metal employed in forming the head portion 132. In the formation of the valve shown in Fig. 11 the parts 130 and 132 are originally independently formed and the stem portion 130 originally is provided with a closed end portion (not shown) at that end thereof which is projected into the head portion 132, and radial openings 140 are provided through its walls in that portion thereof adjacent the closed end and within the area enclosed within the bore 134. The head 132 and stem 130 are temporarily welded and sealed together at 139. The molten material which is to form the bonding and sealing sleeve 136 is then introduced into the hollow interior of the stem 130, the assembly is heated until the material has become molten, the assembly is then spun around the axis of the stem 130 which thereupon causes a certain amount of this molten metal to flow through the openings 140 and between the opposed walls of the stem portion 130 and head portion 132 where it is later solidified into the ring 136. A certain amount of this material will escape into the interior of the hollow head of the valve and may form a peripherally distributed ring 140 therein as indicated, which ring, as will be obvious, has no function. After the molten metal has solidified a drill or other suitable tool is projected down through the hollow stem 130 from the open end thereof and the closed end of the stem is drilled out so as to provide open communication between the interior of the hollow head 132 and the interior of the stem 130 as shown.

Other modifications of the invention will, of course, be apparent to those skilled in the art from the teachings herein given and, accordingly, it will be understood that the various modifications shown and described are to be considered as illustrative of the broad principles of the invention and not as describing the limits of the invention, and that formal changes may be made in the specific embodiments of the invention described without departing from the spirit or substance of the broad invention the scope of which is commensurate with the appended claims.

What I claim is:

1. A hollow article comprising a tubular main body portion, a separately formed end portion, and means generally spacing said portions bonded thereto and securing and sealing said portions together comprising a centrifugally distributed mass of material having a melting point lower than that of both said portions.

2. A hollow article comprising a tubular main body portion, a separately formed end portion arranged in aligned relation with respect to said main body portion, the adjacent surfaces of said portions being so constructed and arranged as to provide an annular groove between them opening internally of said article, and a mass of welding material filling said groove adhering to both of said portions securing and sealing said portions together.

3. A poppet valve comprising a pair of independently formed parts, and means bonded to both of said parts rigidly securing said parts together in fixed relation and providing a seating surface for said valve proximate to the junction between said parts.

4. A poppet valve comprising a pair of portions and a third portion separating the first two portions and rigidly securing them in fixed relation to each other forming a seating surface for said valve.

5. In a poppet valve, in combination, a multi-part hollow head, and means forming a valve seating surface for said head disposed both internally and externally thereof and integrating the parts of said head.

6. In a poppet valve, in combination, a pair of portions, and means rigidly connecting said portions comprising a material of harder character than said portions and intimately bonded thereto, the junction between said portions being so constructed and arranged that said material at said junction inherently provides material for forming a valve seating surface, and said material being shaped to provide the seating surface of said valve.

7. A poppet valve comprising a pair of portions separated from one another adjacent the area of the valve seating surface thereof, and means formed of a material different than the material of said portion interconnecting said portions proximate to said area and simultaneously forming said valve seating surface.

8. A poppet valve including a hollow head providing a pair of portions, and a third portion exposed on the exterior surface thereof and including the valve seating surface area thereof, and a fourth portion disposed interiorly of said hollow head, said third portion and fourth portion being formed of a material different from said pair of portions and said fourth portion being intimately bonded to both said pair of portions.

9. In a poppet valve, in combination, a multi-part hollow head, and means forming a valve seating surface for said head exposed both internally and externally thereof and welded to the parts of said head throughout its area of contact therewith.

10. A poppet valve comprising a hollow stem portion having a hollow flared end, an axially extending ring on said flared end, a cap for closing said flared end, said cap contacting an axial face of said ring and being axially located thereby, and means bonded to both said cap and said flared end portion sealing them together.

11. A poppet valve comprising an independently formed hollow head having a reduced opening leading thereinto and a seating surface formed exteriorly thereon, a hollow stem projecting into said opening, and means bonded to both said head and stem interposed between them and securing and sealing them together.

12. A hollow poppet valve comprising a main body portion having a hollow flared end portion and a cover portion for said flared end portion, the adjacent surfaces of said portions being located proximate to the seating surface of said valve and being so constructed and arranged as to provide an annular groove between them, and a mass of welding material filling said groove adhering to both of said portions and providing said seating surface.

GEORGE CHARLTON.